Patented Nov. 27, 1951

2,576,268

UNITED STATES PATENT OFFICE 2,576,268

CELLULOSE ESTER PLASTICIZED WITH A 1-4 BUTANDIOL DIESTER

Gershon J. Shugar, Jersey City, and Walter D. Paist, Orange, N. J., assignors to Celanese Corporation of America, a corporation of Delaware No Drawing. Application May 24, 1947,
Serial No. 750,374

6 Claims. (Cl. 106—180)

This invention relates to certain novel organic compounds and relates more particularly to the preparation of symmetrical and mixed di-esters of 1,4-butanediol.

An object of this invention is the provision of novel processes for the production of symmetrical and mixed di-esters of 1,4-butanediol.

Another object of this invention is the production of certain symmetrical and mixed di-esters of 1,4-butanediol having a solvent and/or plasticizing action on cellulose acetate, cellulose propionate or other organic derivatives of cellulose, synthetic resins, synthetic rubbers, etc.

A further object of this invention is the provision of novel plasticized compositions having a basis of cellulose acetate or other thermoplastic organic derivative of cellulose.

Other objects of this invention will appear from the following detailed description.

The cyclic compound tetramethylene oxide, also known as tetrahydrofuran, is produced in substantial quantities as a by-product of the partial oxidation of butane. The four carbon chain contained in said cyclic compound renders it of great potential value for the synthesis of numerous higher molecular weight organic compounds by reactions in which the cyclic ring may be opened.

We have now found that novel symmetrical and mixed di-esters of 1,4-butanediol may be obtained by catalytically reacting aliphatic, hydroaryl and aromatic organic acids, with tetramethylene oxide at a temperature of 115 to 350° C. Advantageously, we employ a catalyst such as anhydrous zinc chloride, aluminum chloride, concentrated sulfuric acid or concentrated phosphoric acid to aid the ring-opening and esterification reaction. The reaction proceeds satisfactorily in certain cases at refluxing temperatures. Better yields of the desired di-esters are obtained, however, when the reaction is carried out under a super-atmospheric pressure of at least 15 pounds per square inch. Thus, by reacting acetic acid, propionic acid, butyric acid, 2-ethylhexoic acid, lauric acid, cyclohexyl-acetic acid, gamma-cyclohexyl-butyric acid, furoic acid, benzoic acid, phenyl-acetic acid, or phthalic acid, for example, with tetramethylene oxide in accordance with our process the corresponding di-esters of 1,4-butanediol are obtained. When employing mixtures of said acids such as a mixture of acetic and butyric acid, propionic and benzoic or phenyl acetic and phthalic acid, for example, mixed esters of 1,4-butanediol are obtained.

The di-esters of 1,4-butanediol, and particularly the di-esters with lower aliphatic acids such as 1,4-butanediol-diacetate, 1,4-butanediol dipropionate, and 1,4-butanediol dibutyrate are very valuable intermediates for the preparation of higher mixed and symmetrical di-esters of 1,4-butanediol by ester exchange reaction in lieu of direct esterification. Thus, by reacting 1,4-butanediol-diacetate, for example, with an organic acid which is less volatile than acetic acid and employing a suitable acid catalyst, such as sulfuric acid, one or both acetyl groups of the diacetate may be split off and replaced by the acyl radical of the acid of lesser volatility which is present in the reaction medium. Basic or salt catalysts may also be employed. The acetic acid formed during the reaction distills off as the ester exchange reaction proceeds and, if the reaction is effected employing a suitable mol ratio of reactants, one or both acetyl groups may be replaced. Thus, by reacting 1,4-butanediol-diacetate with stearic acid, for example, 1,4-butanediol acetate-stearate or 1,4-butanediol distearate may be obtained. Similarly, by reacting 1,4-butanediol diacetate under ester exchange conditions with, for example, cyclohexyl-acetic acid, cyclohexyl-butyric acid, cyclohexyl-caproic acid, furoic acid, or any other organic acid of lesser volatility than acetic acid, including those mentioned above and which may also be employed, for example, in the ring-opening reaction, the corresponding symmetrical or mixed di-esters of 1,4-butanediol are formed.

The ester exchange reaction provides a convenient and effective method for producing any desired mixed or symmetrical ester of 1,4-butanediol. Thus, the reaction of tetramethylene oxide with acetic acid, at elevated temperature and pressure enables 1,4-butanediol diacetate to be obtained in excellent yield. The diacetate obtained is then available for use as an intermediate in the production of the higher esters by the ester exchange reaction. In some instances, the production of certain esters by the ring opening reaction of tetramethylene oxide under elevated temperature or pressure is preferred, while in others, the ester exchange method provides a more efficient means for obtaining the desired higher esters in high yield.

Di-esters may also be obtained conveniently by catalytically reacting tetramethylene oxide with acid anhydrides at elevated temperatures of 175 to 350° C. under pressures of 15 to 2000 pounds per square inch, or at atmospheric pressure.

The di-esters of 1,4-butanediol comprise excellent solvents for various organic materials. The higher mixed and symmetrical di-esters are, we have found, excellent plasticizers for thermoplastic cellulose esters, such as, for example, cellulose nitrate, cellulose acetate, cellulose propionate, cellulose butyrate, cellulose acetate-propionate, cellulose acetate-butyrate, as well as cellulose ethers, such as ethyl cellulose and benzyl cellulose. Other thermoplastic materials which may be dissolved in, plasticized or modified with said novel plasticizing compounds are vinyl chloride, vinyl chloride-acetate copolymer, vinyl chloride-vinylidene chloride copolymers, styrene, styrene-butadiene copolymer, as well as many other synthetic resins.

In order further to illustrate our invention but without being limited thereto the following examples are given:

Example I 800 parts by weight of tetramethylene oxide and 1200 parts by weight of glacial acetic acid are entered into an autoclave together with 15 parts by weight of freshly fused zinc chloride. The autoclave is sealed and then heated with agitation to a temperature of about 260° C. for about 10 hours. The autoclave is cooled, vented and the reaction product is fractionally distilled. The fraction boiling at 225 to 230° C. comprises 1,4-butanediol-diacetate. A yield of 245 parts by weight is obtained which is equivalent to 60% of theory. Vinyl ethyl acetate, i. e.,

$$CH_2=CH-CH_2CH_2-O-\overset{O}{\underset{\|}{C}}-CH_3$$

is also formed during this reaction. 1,4-butanediol diacetate is an excellent solvent for cellulose acetate at room temperature. The vinyl ethyl acetate formed boils at 125° C. and is an excellent solvent for cellulose derivatives as well as for polyvinyl chloride, copolymers of vinyl chloride and vinyl acetate and other polymeric compounds.

Example II 144 parts by weight of tetramethylene oxide, 648 parts by weight of 2-ethyl-hexoic acid and 26 parts by weight of fused zinc chloride are placed in an autoclave. The autoclave is sealed and the reaction mixture heated to a temperature of 250° C. over about 2 hours after which it is maintained between 250 and 267° C. for about 6 hours. The crude product obtained on completion of the reaction is washed alkaline with an aqueous solution of sodium carbonate, extracted with ether and then washed neutral with a saturated solution of sodium chloride. The ether is evaporated from the product and the latter then vacuum distilled. The ester obtained, 1,4-butanediol-di-2-ethyl-hexoate, has a boiling point of 147 to 153° C. at a pressure of 1 mm. of mercury, a specific gravity at 25/25° C. of 0.926 and an index of refraction at 25° C. of 1.4457. At elevated temperatures this novel ester is an excellent solvent of cellulose esters such as, for example, cellulose propionate having 0.3 free hydroxyl groups. When cellulose propionate of 0.3 free hydroxyl groups is plasticized with this ester in the proportion of 100 parts by weight of cellulose propionate to 20 parts by weight of 1,4-butanediol-di-2-ethyl-hexoate and then molded for 15 minutes at 200° C. under pressure, tough molded articles are obtained which may be remolded very satisfactorily, indicating the excellent plasticizing action this ester possesses.

Example III 188 parts by weight of chloroacetic acid and 2 parts by weight of freshly fused zinc chloride are placed in a reaction vessel and the solution brought up to refluxing temperature. 160 parts by weight of tetramethylene oxide are then added slowly to the refluxing solution while the temperature is gradually raised from about 95° C. to about 185° C. The ring-opening and esterification reaction yields the novel ester 1,4-butanediol-di-chloracetate which has a melting point of about 81° C. When melted, the ester is an excellent solvent for cellulose propionate having 0.3 free hydroxyl groups.

Example IV 360 parts by weight of tetramethylene oxide and 950 parts by weight of propionic anhydride are entered into an autoclave together with 15 parts by weight of freshly fused zinc chloride. After being sealed, the autoclave is heated and agitated to 260° C. for 13 hours. The autoclave is cooled, vented and the reaction product fractionally distilled. A fraction boiling at 249° C. is obtained which comprises 1,4-butanediol-dipropionate. A yield of 67% of theory is obtained. This novel ester boils at 148 to 150° C. at a pressure of 30 mm. of mercury, has a density of 1.012 at 25° C. and a refractive index of 1.4253 at 25° C. It is practically insoluble in water and dissolves cellulose propionate having 0.3 free hydroxyl groups at room temperature. When this cellulose propionate is plasticized with 1,4-butanediol-dipropionate in a ratio of 100 parts by weight of cellulose propionate to 15 parts by weight of the ester, articles molded from said composition exhibit excellent impact strength.

The 1,4-butanediol-dipropionate dissolves cellulose acetate at 165° C. and discs molded of a composition comprising 100 parts by weight of cellulose acetate and 30 parts by weight of said ester have good color, transparency and impact strength.

Example V 226 parts by weight of benzoic anhydride and 9 parts by weight of fused zinc chloride are placed in a reaction vessel provided with a reflux condenser and the mixture heated to 250° C. Tetramethylene oxide is then added gradually, the temperature rising to 255° C. after about 25 parts of tetramethylene oxide are added. The temperature then drops gradually and reaches 175° C. after a total of about 72 parts by weight of tetramethylene oxide have been added. The crude reaction mixture is then poured into a 10% aqueous solution of sodium hydroxide and the crude 1,4-butanediol-dibenzoate precipitates. The precipitate is washed, distilled at 255 to 258° C. at 15 mm. of mercury, precipitated from alcohol and de-colorized with activated charcoal. The purified 1,4-butanediol-dibenzoate has a melting point of 81 to 82° C.

Example VI 765 parts by weight of lauric anhydride and 114 parts by weight of tetramethylene oxide together with 10 parts by weight of freshly fused zinc chloride are charged into an autoclave which is sealed and heated with agitation to about 260° C. for 14 hours. On completion of the reaction fractionation of the reaction mixture yields a fraction boiling at 267 to 280° C. at 20 mm. pressure comprising 1,4-butanediol-dilaurate. A yield of 50% of theory is obtained. At room temperature 1,4-butanediol-dilaurate is a light yellow creamy wax, which has a melting point of 42 to 44° C.

Example VII

A mixture of 110 parts by weight of stearic acid, 35 parts by weight of 1,4-butanediol-diacetate and 6 parts by weight of concentrated sulfuric acid are placed in a reaction vessel provided with a partial take-off distilling column. The mixture in the vessel is heated gradually to about 170° C. at which point acetic acid begins to distill over. Heating is continued and the temperature gradually raised over the course of 2 hours to about 310° C. After the theoretical amount of acetic acid has been split off to yield 1,4-butanediol-acetate-stearate and has distilled over, the reaction product is cooled, and then fractionally distilled in an atmosphere of carbon dioxide. A fraction boiling at 300 to 320° C. at 15 mm. pressure is obtained which comprises the mixed 1,4-butanediol-acetate-stearate. At room temperatures, the latter is a light creamy wax melting at 38 to 39° C.

Example VIII 58 parts by weight of 1,4-butanediol-diacetate are mixed with 94 parts by weight of cyclohexylacetic acid and 4.5 parts by weight of concentrated sulfuric acid and the mixture heated in a suitable reaction vessel, provided with a fractional distilling column. The temperature is raised gradually to 200° C. and acetic acid begins to distill over. The reaction is continued for about ½ hour while maintaining the temperature at 200 to 215° C. When the theoretical amount of acetic acid has distilled over, indicating completion of the ester exchange reaction, the reaction mixture remaining in the reaction vessel is washed with water and sodium carbonate, extracted with ether, the ether extract dried over anhydrous carbonate and fractionally distilled under 17 mm. pressure. A small fraction comes over between 200 and 247° C. at this pressure. The major fraction comprising about 38 parts by weight and consisting essentially of 1,4-butanediol-dicyclohexylacetate comes over at 248 to 255° C. This novel ester has a density at 25° C. of 1.0056 and a refractive index at 25° C. of 1.4705. At 130° C. this ester dissolves 0.3 free hydroxyl cellulose proprionate. When 100 parts by weight of cellulose propionate having 0.3 free hydroxyl groups are plasticized with 20 parts by weight of 1,4-butanediol-dicyclohexylacetate, the composition obtained has an A. S. T. M. flow test temperature of 156° C. When molded at 200° C. for 15 minutes, the molded products obtained have excellent color, impact strength and transparency.

Example IX 140 parts by weight of 1,4-butanediol-diacetate, 112 parts by weight of cyclohexylcaproic acid and 8 parts by weight of concentrated sulfuric acid are entered into a reaction vessel provided with a fractional distillation head and the mixture heated gradually. When the temperature reaches about 170° C., acetic acid begins to distill over. Heating is continued and the temperature of the reaction mixture rises to about 245° C. over about two hours. The reaction mixture obtained is then fractionally distilled under reduced pressure. The fraction, boiling at 186 to 188° C. at 3 mm. pressure, is found to be 1,4-butanediol-acetate-cyclohexylcaproate. This novel ester has a density of 1.007 at 25° C. and a refractive index of 1.4592 at 25° C. A second fraction boiling at 248 to 252° C. at 3 mm. pressure is found to be 1,4-butanediol-dicyclohexyl-caproate. The latter has a density of 0.971 at 25° C. and a refractive index of 1.4723 at 25° C.

When 100 parts by weight of cellulose propionate having 0.3 free hydroxyl groups are plasticized with 20 parts by weight of 1,4-butanediol-di-cyclohexyl-caproate and the composition molded at 200° C. for 15 minutes, excellent molded products are obtained. The mixed ester 1,4-butanediol-acetate-cyclohexyl-caproate dissolves 0.3 free hydroxyl cellulose propionate at 25° C. and tough molded articles are obtained when 20 parts by weight of this ester are employed to plasticize 100 parts by weight of the above cellulose propionate. This plasticized cellulose propionate composition has an A. S. T. M. flow test temperature of 154° C.

Example X 3 parts by weight of 1,4-butanediol-dilaurate are dissolved in 30 parts by weight of petroleum ether and the solution obtained then mixed thoroughly with 30 parts by weight of ethyl cellulose of 45 to 47% ethoxyl value. The petroleum ether is evaporated off and the plasticized ethyl cellulose molded into discs at 200° C. for 15 minutes. The discs are clear and light amber in color. Stabilizers such as decyl sulfite may be added.

Example XI

Similarly, by reacting 1,4-butanediol-diacetate at about 120° C. with an excess of furoic acid employing sulfuric acid as catalyst and toluene as a solvent diluent, 1,4-butanediol-difuroate is obtained. This ester has a boiling point of 133 to 145° C. at a pressure of 1.5 mm. of mercury. At 35° C. the ester completely dissolves cellulose propionate having 0.3 free hydroxyl groups. When employed as a plasticizer for said cellulose propionate, excellent molded products are obtained.

It is to be understood that the foregoing detailed description is given merely by way of illustration and that many variations may be made therein without departing from the spirit of our invention.

Having described our invention, what we desire to secure by Letters Patent is:

1. A thermoplastic composition of matter comprising essentially an organic acid ester of cellulose plasticized with a member of the group consisting of 1,4-butanediol-dilaurate, 1,4-butanediol-di-2-ethylhexoate and 1,4-butanediol-dicyclohexyl-acetate.

2. A thermoplastic composition comprising essentially cellulose acetate plasticized with 1,4-butanediol-dilaurate.

3. A thermoplastic composition comprising essentially cellulose acetate plasticized with 1,4-butanediol-di-2-ethyl-hexoate.

4. A thermoplastic composition comprising essentially cellulose propionate plasticized with 1,4-butanediol-di-cyclohexyl-acetate.

5. A thermoplastic composition comprising essentially cellulose propionate plasticized with 1,4-butanediol-dilaurate.

6. A thermoplastic composition comprising essentially cellulose propionate plasticized with 1,4-butanediol-di-2-ethyl-hexoate.

GERSHON J. SHUGAR.
WALTER D. PAIST.

(References on following page)

REFERENCES CITED

The following references are of record in the file of this patent:

UNITED STATES PATENTS

| Number | Name | Date |
|---|---|---|
| 1,836,701 | Carrol | Dec. 15, 1931 |
| 2,062,918 | Lawson | Dec. 1, 1936 |
| 2,136,499 | Gloor | Nov. 15, 1938 |
| 2,162,451 | Ropp | June 13, 1939 |
| 2,196,758 | Dickey et al. | Apr. 9, 1940 |
| 2,265,184 | Miescher et al. | Dec. 9, 1941 |
| 2,299,862 | Toussaint | Oct. 27, 1942 |
| 2,336,223 | Coleman | Dec. 7, 1943 |
| 2,341,464 | Meyer | Feb. 8, 1944 |
| 2,366,667 | Deebel | Jan. 2, 1945 |